United States Patent

Appleford et al.

[11] Patent Number: 5,497,672
[45] Date of Patent: Mar. 12, 1996

[54] VALVE ACTUATOR

[75] Inventors: David E. Appleford, Essex; David Engerran, London, both of Great Britain

[73] Assignee: Alpha Thames Engineering Limited, England

[21] Appl. No.: 175,363
[22] PCT Filed: Jun. 26, 1992
[86] PCT No.: PCT/GB92/01164
§ 371 Date: Dec. 27, 1993
§ 102(e) Date: Jan. 26, 1994
[87] PCT Pub. No.: WO93/00539
PCT Pub. Date: Jan. 7, 1993

[30] Foreign Application Priority Data

Jun. 28, 1991 [GB] United Kingdom ............ 9113963

[51] Int. Cl.⁶ .................... F16K 31/04; G05G 17/00
[52] U.S. Cl. ............... 74/424.8 VA; 74/2; 185/40 R; 251/69; 251/71
[58] Field of Search ............ 74/424.8 VA, 2; 185/40 R; 251/69, 71

[56] References Cited

U.S. PATENT DOCUMENTS 3,512,421  5/1970  Anderson ............... 251/69 X
3,518,891  7/1970  Denkowski ............ 74/89.15

FOREIGN PATENT DOCUMENTS 1085547  10/1967  United Kingdom.
1141082  1/1969  United Kingdom.

*Primary Examiner*—Allan D. Herrmann
*Attorney, Agent, or Firm*—Biebel & French

[57]  ABSTRACT

A valve actuator comprises a stem extending through the actuator body for coupling to a valve such that axial movement of the stem opens and closes the valve. An outer shaft is arranged coaxially around, and in threaded engagement with the stem and is coupled to an electric motor for conveying rotational drive to the shaft and thus axial movement of the shaft relative to the stem against a spring bias. The shaft is releasably retained in a predetermined position by a solenoid-actuated latching mechanism with the spring in a compressed state, such that further rotation of the shaft causes axial movement of the stem relative to the shaft to actuate the valve. Deactuation of the mechanism releases the shaft to allow axial movement of both the shaft and the stem, under action of the spring in order to close the valve. The latching mechanism includes a plurality of retaining members which engage with an angled face of a wedge member, the angle of the wedge face with respect to the longitudinal axis of the stem being close to the angle of friction of the material of which the wedge member and retaining members are made.

7 Claims, 4 Drawing Sheets

VALVE ACTUATOR

BACKGROUND OF THE INVENTION

This invention relates to an actuator for valves, and more particularly for gate valves which may be used to control flow within oil or gas pipelines either above or below sea level.

Known systems used both above and below sea level for controlling the opening and closing of gate valves are either hydraulic, pneumatic or electro-hydraulic actuators, and the most common of these is the hydraulic type. These actuators generally utilize an externally controlled flow of hydraulic fluid, under pressure, to drive a piston within an actuator cylinder. This cylinder compresses a spring stack and moves the valve stem to open or close the valve depending on its configuration. In an emergency situation when the valve must be shut quickly, the spring force can be used to achieve this.

However, hydraulic actuators have a number of operational disadvantages that would make the actuator unsuitable for some subsea applications. For example, as the distance between the hydraulic actuator and the top-side control center increases, the amount of hydraulic fluid needed to fill the lines and operate the valve also increases. Over long distances the fluid can lose pressure and therefore accumulators have to be installed close to the actuator to back up the pressure. Within some existing systems the time between a signal being sent from a control center and the actuator responding to the signal can be a matter of minutes, which in emergency situations can be too long. Furthermore, when the distance between the two sites reaches an optimum length, the hydraulic actuator will not be able to operate at all. An increase in water depth can also affect the actuator performance. The cost and size of the hydraulic lines and umbilicals also greatly increase as the operational depths and distances compound. It has therefore become apparent that a new design of actuator is required that will not be affected by depth/distance and that will have a fast response time, and it has been decided that an all electric valve actuator will meet these requirements.

SUMMARY OF THE INVENTION

It is therefore an object of the present invention to provide a valve actuator which operates solely by electricity and which has a simple and cost-effective construction.

Accordingly, the present invention consists in a valve actuator comprising a stem extending through the actuator for coupling to the valve such that axial movement of the stem opens and closes the valve, an outer shaft arranged coaxially around the stem and in threaded engagement therewith, means coupling the shaft to an electric motor to cause rotational and thus axial movement of the shaft relative to the stem against a spring bias, and a solenoid-actuated latching mechanism for releasably retaining the shaft in a predetermined position with the spring held in a compressed state, such that further rotation of the shaft causes reciprocating axial movement of the stem relative to the shaft to actuate the valve, and de-activation of the solenoid-actuated mechanism releases the shaft to allow axial movement of both the shaft and the stem, under action of the spring, in order to close the valve.

In a preferred embodiment, the latching mechanism includes a cap retaining the spring and being connected to one end of the shaft, the cap having one or more recesses formed in a surface thereof, and a wedge member moved by one or more solenoids to push and hold a plurality of retaining members, for example ball bearings, into engagement with the recess or recesses in order to effect the latching action. The wedge member may be formed with an angled surface, the angle of which is dependent on the force of the spring as compared to the holding force of the one or more solenoids. The angle of the wedge member may be arranged so as to provide a sufficient mechanical advantage to enable the one or more solenoids with a relatively low holding force to retain the spring in its compressed state. In a preferred arrangement, wherein the retaining members are ball bearings made of steel, the angle of the wedge member is made substantially close to the angle of friction for steel on steel.

The spring retaining cap may be cylindrical with the spring extending around its external surface and the recess or recesses being in the form of an annular groove extending around the internal surface of the spring retaining cap. The wedge member may be an annular shape arranged coaxially around the stem within the cylindrical cap and being arranged to be moved by a plurality of solenoids positioned equiangularly around the stem. In this arrangement, the retaining members are pushed outwardly into the annular groove in a radial direction with respect to the axis of the stem.

The means coupling the shaft to the electric motor preferably consist of an outer cylindrical hub in splined mating with the shaft and a worm and wheel arrangement for conveying rotational drive to the hub and thus to the shaft.

In one example, the interior of the actuator body is filled with oil, and for subsea applications, one wall of the actuator is formed with a flexible diaphragm or bellows so that the oil contained therein can be used to pressure balance the interior of the actuator with the ambient water pressure. The oil is also used to lubricate the moving parts of the actuator.

Thus, by removing the hydraulic power element, electricity becomes the common source for both the motive power and control system of the actuator. This simplifies the system as less connections and interfaces are required; cabling requirements are improved; and the control system is simplified, thus saving in terms of size and weight on the topside facility. Furthermore, with an all electric actuator it is possible to accurately monitor the position of the valve at any point between fully opened and fully closed, if required, as well as being able to vary the position of the valve anywhere between the open and closed positions.

BRIEF DESCRIPTION OF THE DRAWINGS

The invention will be further described by way of example with reference to the accompanying drawings, wherein.

DESCRIPTION OF THE PREFERRED EMBODIMENT

Figure 1:
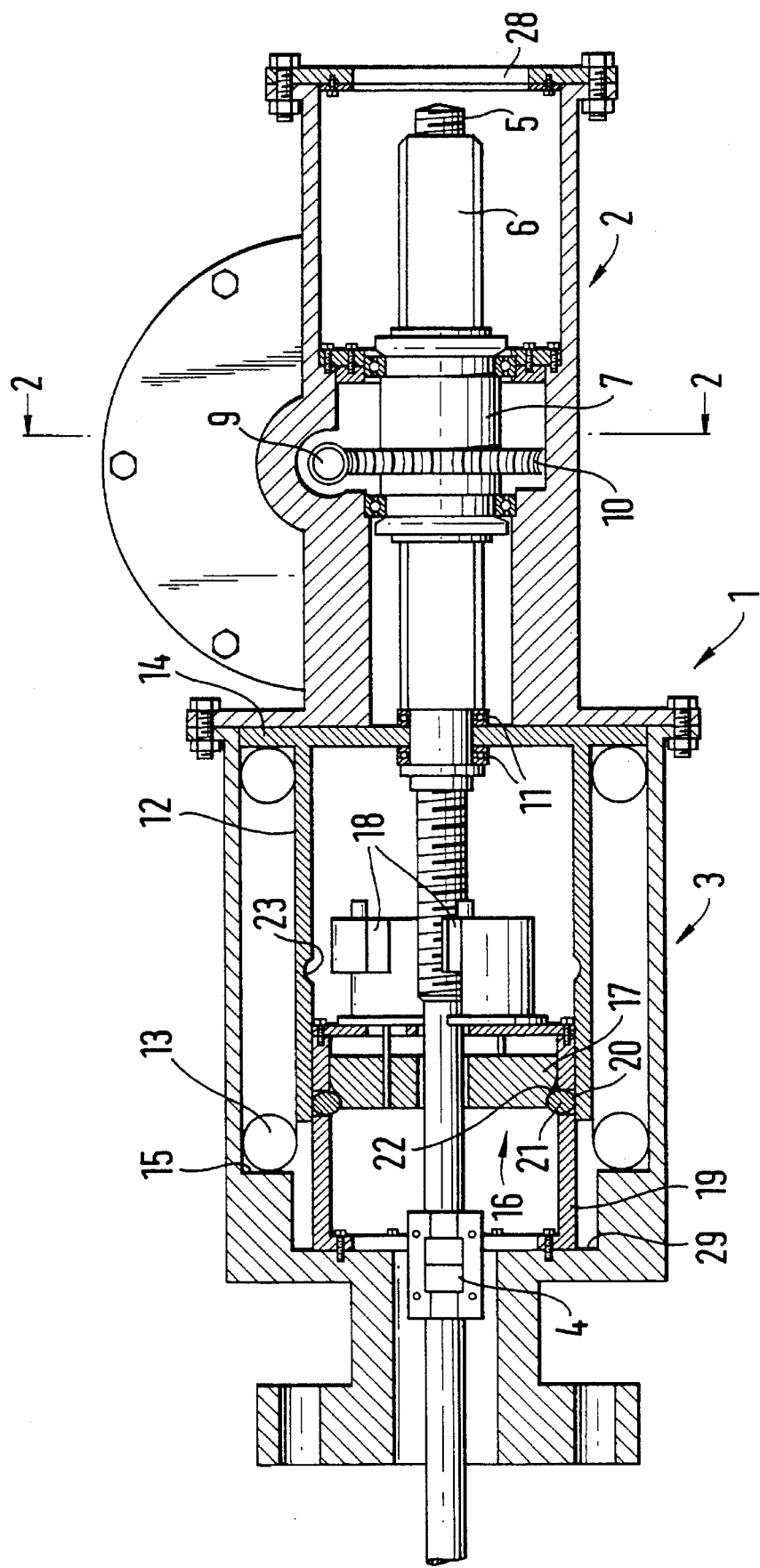
FIG. 1 shows a longitudinal sectional view through an actuator in accordance with one embodiment of the invention, before connection to a valve.
Figure 2:
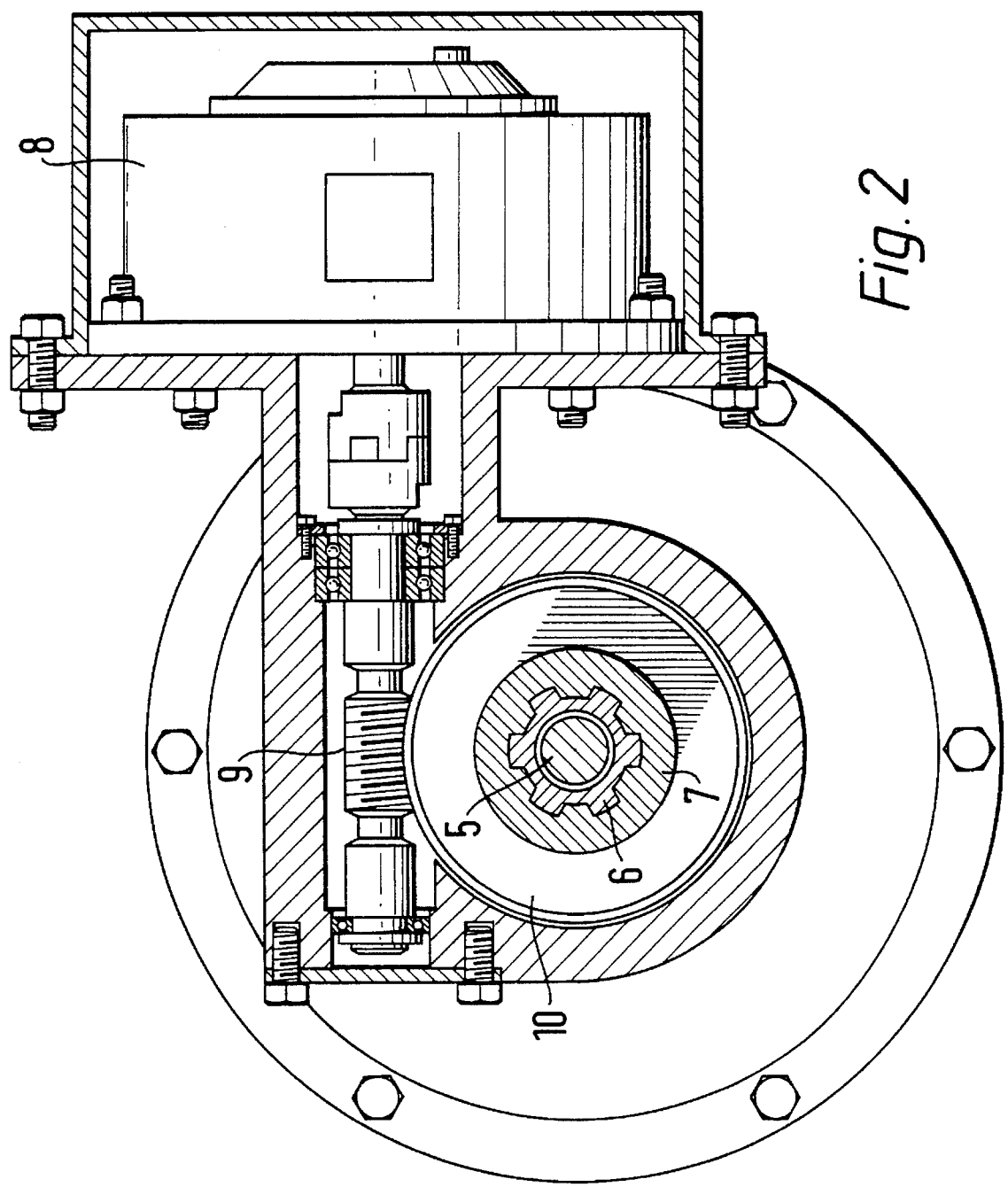
FIG. 2 shows a sectional view along line 2—2 in FIG. 1.

Referring firstly to FIGS. 1 and 2, a valve actuator 1 comprises parts 2 and 3 bolted together with a flexible diaphragm assembly 28 closing the opposite end of the part 2 and a split coupling 4 provided in the opposite end of the part 3 for connection to a conventional gate valve as will be described below with respect to FIG. 3.

An actuating stem 5 extends through both parts of the actuator body and the part of its length within the body part 2 is in screw-threaded engagement with an outer cylindrical shaft 6 which is arranged coaxially with the stem 5. The shaft 6 has a splined external surface which mates with grooves located on the inner surface of a cylindrical hub 7 surrounding a length of the shaft in coaxial arrangement. The hub 7 is coupled to an electric motor 8 via a worm and wheel mechanism 9,10. The inner end of the shaft 6 is connected by annular bearings 11 to a cylindrical cap 12 located within the other part 3 of the actuator. The cap 12 has a cylindrical spring 13 located around its outer surface, and the spring is retained between end face 14 of the cap and a shoulder 15 formed on the internal side surface of the actuator.

The actuator body part 3 also contains a latching mechanism 16 which consists of an annular wedge 17 movable in a direction generally parallel to the axis of the stem 5 by a plurality of solenoids 18 arranged equiangularly around the stem. The wedge 17 moves relative to a fixed cylindrical frame 19 which has a plurality of apertures 20 around its periphery. Each aperture 20 has a ball bearing 21 retained within it by an angled surface 22 of the wedge 17. The internal surface of the spring retaining cap 12 has an annular groove 23 which is intended to engage with the ball bearings 21 as will be described below.

Figure 3:
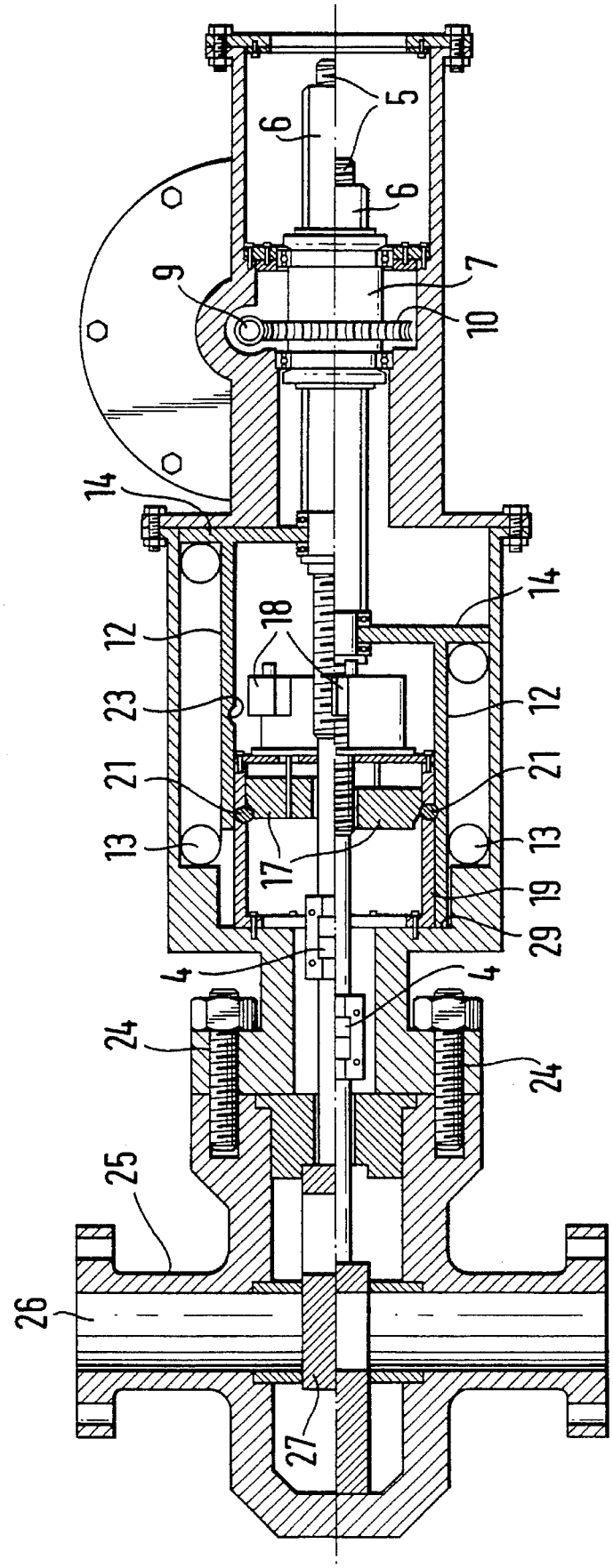
FIGS. 3 shows the same section as FIG. 1 with the actuator connected to a conventional gate valve and showing two stages of operation in its upper and lower halves respectively.

Referring now also to FIG. 3, the actuator 1 is connected by bolts 24 to a conventional gate valve 25 having a through-bore 26 which is opened and closed by transverse movement of a valve gate 27. The valve gate 27 is connected to the end of the actuating stem 5 of the actuator by the split coupling 4.

When the actuator is initially connected to the valve, the valve is closed as shown in the upper half of FIG. 3. The first part of the actuator operation is the compression of the spring 13. This is achieved by activation of the motor 8 which causes rotation of the hub 7 via the worm and wheel mechanism 9,10. Due to the splined mating of the hub 7 with the shaft 6, the shaft 6 also rotates. As the valve is closed the stem 5 cannot move, so that the hub 7 is forced to wind along the screw-thread towards the latching mechanism 16. As the spring retaining cap 12 is connected to the shaft end, the cap 12 also moves axially, thereby compressing the spring 13, until it reaches the inner end wall 29 of the actuator part 3, as shown in the lower half of FIG. 3. When the spring retaining cap has reached this position, which can be detected by microswitches (not shown) on the actuator, the solenoids 18 are activated to move the annular wedge 17 towards the valve which pushes the ball bearings 21 radially outwardly and holds them in engagement with the annular groove 23. In this way, the ball bearings 21 hold the spring retaining cap 12, and thus the shaft 6, in a fixed axial position against the bias of the compressed spring 13.

In order to open the valve, the motor direction is reversed. As the hub 7 can only rotate due to the pearings 11 and cannot move axially, the actuating stem 5 is forced to move axially towards the valve due to its screw-threading, which pushes the valve gate 27 to the open position shown in the lower half of FIG. 3. In order to close the valve again, the motor direction is again reversed and the actuator stem 5 moves axially away from the valve pulling the valve gate 27 into the closed position. This opening and closing of the valve can thus be repeated as many times as required merely by reversing the motor direction. If, at any time, there is an emergency, such as a power failure, or some other necessity to close the valve quickly, the solenoids 18 are de-activated by cutting off their power supply. This releases the annular wedge 17 so that the ball bearings 21 are no longer held by the wedge within the groove 23. The spring retaining cap 12, and thus the shaft 6, are therefore released and the force of the compressed spring 13 pushes them axially away from the valve, thereby dislodging the groove from the ball bearings. Due to the screw-threading, the stem 5 is also forced to move axially away from the valve, and the valve gate 27 is thus closed. Once the problem within the system has been rectified, the actuator can be reset to the latched position shown in the lower half of FIG. 3.

Figure 4:
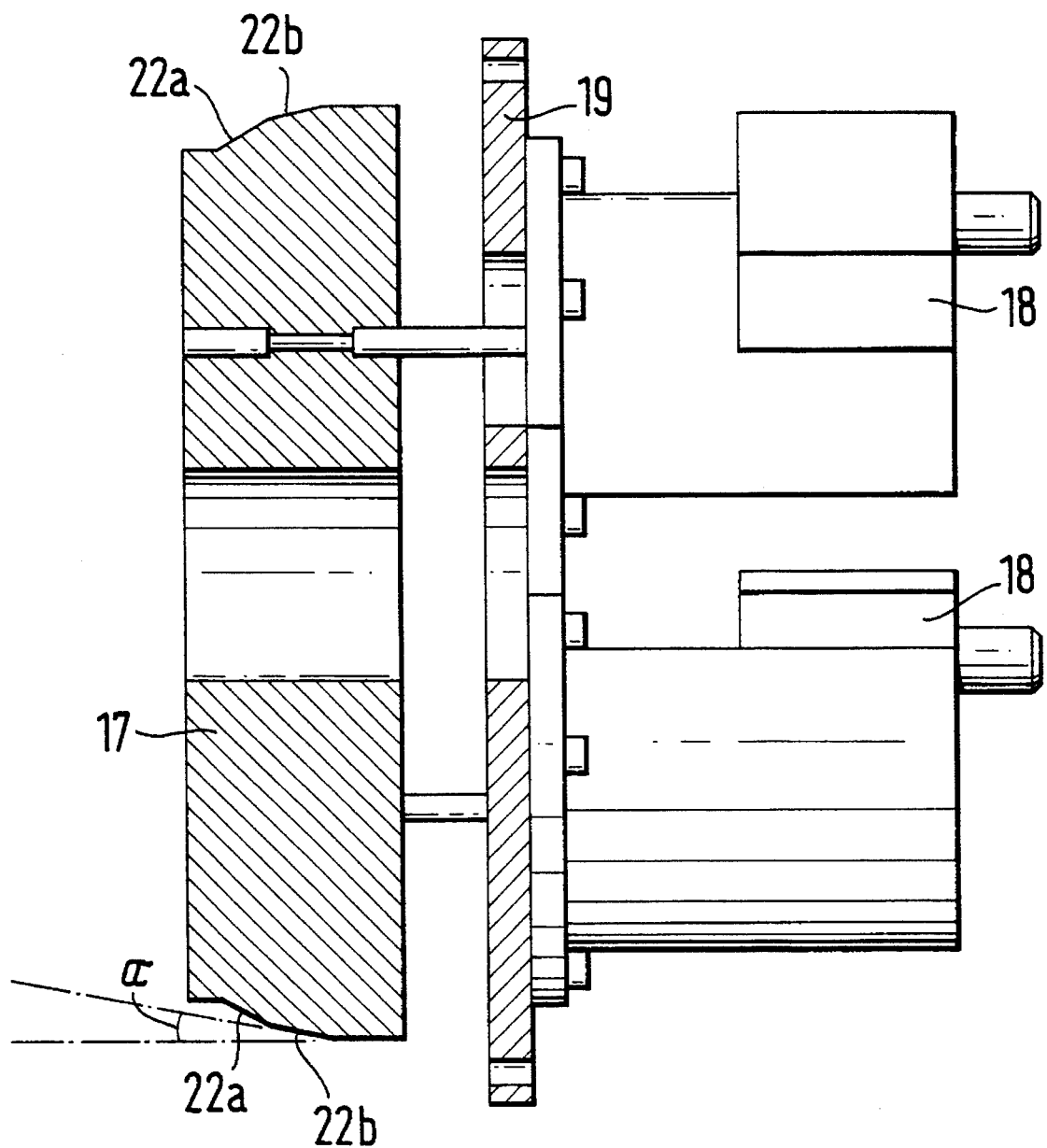
FIG. 4 shows an enlarged fragmentary sectional view of part of the actuator shown in FIG. 1.

In the solenoid latching mechanism, it is necessary to overcome the difference between the force that the spring exerts and the force that the solenoids can hold. For example, the force that the spring exerts can be in the region of 225000N and the force that each solenoid can hold is generally in the region of only 200N. Thus a system with a high mechanical advantage is required, and the use of more than one solenoid is usually needed to increase the overall available holding force. The enlarged view of the wedge and solenoids in FIG. 4 shows more clearly the angled surface 22. This surface comprises two faces 22a and 22b, with face 22a being at a larger angle than face 22b. In cooperation of these faces with the ball bearings 21, the ball bearings engage with the face 22a in the unlatched position of the mechanism 16 and with the face 22b in the latched position in which they are pushed outwardly into engagement with the groove 23. The angle $\alpha$ of the face 22b determines the force that is resolved from the spring, through the wedge and balls to the solenoids, when in the latched position. When using steel ball bearings, making the angle $\alpha$ close to the angle of friction for steel results in the solenoids, with a relatively low holding force, being able to hold the latched position against the force of the spring in its compressed position. With the wedge face 22b at this angle no force is transferred to the solenoids, and by increasing the angle slightly a small force is transferred to them, which is necessary to ensure that the wedge is forced away from the valve thereby releasing the balls if there is a power failure.

The interior of the actuator is filled with a form of oil. In subsea applications, by means of the flexible diaphragm assembly 28, the oil is used to pressure balance the inside of the actuator with the ambient sea water to prevent the actuator from being crushed. As the sea water pushes on the outside of the diaphragm it flexes inwards and compresses the internal oil to the same pressure. This is a method of pressure balancing that has been used for a long time and is very reliable. The diaphragm will be made of a nitrile based material and incorporated into the end of the actuator. As an alternative to a diaphragm, a bellows may be used.

The majority of the parts of the actuator may be manufactured from steel. A number of the parts will be hardened and tempered or given a similar heat treatment to improve certain material properties e.g. hardness, shear strength etc. The main parts that will require treatment are the wedge, the actuator stem, the splined shaft, and the hub. As the inside of the actuator is flooded with the oil, none of the internal parts will need a surface finish applied to them. The oil will protect and lubricate all of the parts.

As an additional feature, a handwheel (not shown) may be provided on the actuator to effect manual rotation of the hub 7. This would be included if the actuator were to be used in an environment where manual operation is possible i.e. in shallow water or a facility above sea level. In deeper water, a Remote Operations Vehicle (ROV) could be used to override the motor if the handwheel or location spigot were in an accessible position. Additionally or alternatively, a visual position indicator (not shown) could be provided, which could be used to allow a diver to see whether the valve was open, closed or in between. An ROV would also have a camera on it that could use this indicator for reference. Although one or both of these features may be used, the actuator is normally intended for a deep subsea environment where divers would be unable to operate the handwheel or use the indicator, so they are not generally provided.

Although a particular embodiment has been described, it will be envisaged that various modifications may be made without departing from the scope of the invention.

Although in the embodiment described the solenoids are activated only when the spring retaining cap reaches the end wall of the actuator, they may alternatively be activated as soon as the actuator is supplied with power. This avoids the necessity of switching on the solenoids at the end of the stroke of the spring retaining cap

We claim:

1. A valve actuator comprising:

a body;

an electric motor;

a stem having a longitudinal axis extending through the body;

first coupling means for coupling the stem to a valve such that axial movement of the stem opens and closes the valve;

an outer shaft arranged coaxially around the stem and in threaded engagement therewith;

second coupling means coupling the shaft to the electric motor to cause rotational and thus axial movement of the shaft relative to the stem;

a solenoid-actuated latching mechanism including a cylindrical cap which is axially movable and has an internal surface formed with at least one recess, a spring retained by said cap, a plurality of retaining members held in a fixed axial position with the cap being axially movable relative thereto, and a wedge member; and at least one solenoid which when activated moves the wedge member to push said retaining members outwardly with respect to said longitudinal axis and to hold them in engagement with said at least one recess, whereby the shaft is releasably retained in a predetermined axial position with the spring held in a compressed state, further rotation of the shaft causing reciprocating axial movement of the stem relative to the shaft to actuate the valve, and de-activation of the at least one solenoid releasing the shaft to allow axial movement of both the shaft and the stem, under action of the spring, in order to close the valve;

said wedge member and said retaining members being made of a material having a predetermined angle of friction and said wedge member having a face which engages with said retaining members and which is formed at an angle with respect to said longitudinal axis, said angle being substantially close to said angle of friction so as to provide a sufficient mechanical advantage to enable said at least one solenoid to retain the spring in its compressed state.

2. A valve actuator as claimed in claim 1, wherein the spring extends around the external surface of the cap and the at least one recess is in the form of an annular groove extending around the internal surface of the cap.

3. A valve actuator according to claim 2, wherein the wedge member is an annular shape arranged coaxially around the stem within the cylindrical cap and is arranged to be moved by a plurality of solenoids positioned equiangularly around the stem, so as to push the retaining members outwardly into the annular groove in a radial direction with respect to the longitudinal axis of the stem.

4. A valve actuator as claimed in claim 1, wherein the second coupling means comprise an outer cylindrical hub in splined mating with the shaft and a worm and wheel arrangement for conveying rotational drive to the hub and thus to the shaft.

5. A valve actuator as claimed in claim 1, wherein the retaining members are ball bearings made of steel, the angle of the wedge member being made substantially close to the angle of friction for steel on steel.

6. A valve actuator as claimed in claim 1, wherein said wedge member has first and second faces, said first face being formed substantially at said angle of friction with respect to said longitudinal axis and being positioned to push and hold the retaining members in the at least one recess when the at least one solenoid is activated, and said second face being formed at an angle with respect to said longitudinal axis which is greater than the angle of said first face and being positioned to engage the retaining members when the at least one solenoid is de-activated.

7. A valve actuator as claimed in claim 1, including a wall formed with one of a flexible diaphragm and bellows.

* * * * *